(12) United States Patent
Buter et al.

(10) Patent No.: US 11,155,418 B2
(45) Date of Patent: Oct. 26, 2021

(54) SPIRAL CONVEYOR CONSTRUCTION AS WELL AS A DRIVE TOWER

(71) Applicant: Ammeraal Beltech Modular A/S, Vejle (DK)

(72) Inventors: Germ Buter, Alkmaar (NL); Kenneth Westergaard Andersen, Vejle (DK)

(73) Assignee: Ammeraal Beltech Modular A/S, Vejle (DK)

( * ) Notice: Subject to any disclaimer, the term of this patent is extended or adjusted under 35 U.S.C. 154(b) by 0 days.

(21) Appl. No.: 16/864,191

(22) Filed: May 1, 2020

(65) Prior Publication Data

US 2020/0346872 A1   Nov. 5, 2020

(30) Foreign Application Priority Data

May 2, 2019   (DK) .......................... PA 2019 70282

(51) Int. Cl.
*B65G 21/18* (2006.01)
*B65G 17/06* (2006.01)
*B65G 23/02* (2006.01)

(52) U.S. Cl.
CPC ........... *B65G 21/18* (2013.01); *B65G 17/061* (2013.01); *B65G 23/02* (2013.01); *B65G 2207/24* (2013.01); *B65G 2812/02415* (2013.01)

(58) Field of Classification Search
CPC .................. B65G 21/18; B65G 17/061; B65G 2812/02415; B65G 2207/24; B65G 23/02
USPC ......................................................... 198/778
See application file for complete search history.

(56) References Cited

U.S. PATENT DOCUMENTS

| 4,852,720 | A | 8/1989 | Roinestad | |
|---|---|---|---|---|
| 10,730,701 | B1* | 8/2020 | Westcott | B65G 17/086 |
| 2011/0056806 | A1* | 3/2011 | Johnson | B65G 21/18 |
| | | | | 198/778 |
| 2015/0090560 | A1 | 4/2015 | Talsma | |
| 2017/0022012 | A1 | 1/2017 | Neely | |
| 2018/0194565 | A1* | 7/2018 | Elsner | B65G 21/18 |

FOREIGN PATENT DOCUMENTS

| CN | 108025874 A | 5/2018 |
|---|---|---|
| WO | 2016179697 A1 | 11/2016 |
| WO | 2017024403 A1 | 2/2017 |

* cited by examiner

*Primary Examiner* — James R Bidwell
(74) *Attorney, Agent, or Firm* — James Creighton Wray

(57) ABSTRACT

A spiral conveyor construction comprises an endless conveyor belt guided on a conveying path. At least a part of the conveying path surrounds a drive tower. Spaced along the periphery of the drive tower are arranged vertical engagement members. Additionally on a lower section of the drive tower adjacent blocks are provided, radially projecting further from the drive tower than the engagement members, and where the blocks are provided with a radially extending secondary rib.

7 Claims, 4 Drawing Sheets

SPIRAL CONVEYOR CONSTRUCTION AS WELL AS A DRIVE TOWER

This application claims the benefit of Danish Application No. PA 2019 70282 filed May 2, 2019, which is hereby incorporated by reference in its entirety as if fully set forth herein.

The present invention relates to a spiral conveyor construction as well as a drive tower for such a spiral conveyor construction.

BACKGROUND OF THE INVENTION

In the art spiral conveyors are used to convey goods along a helically formed conveyor path. The conveyor belt will follow a conveying path around a drive tower. By this design of the conveyor is achieved that a relatively large conveyor belt area may be provided on a relatively small floor area. These types of conveyors are often used in combination with freezing installations or bakery installations such that the entire spiral conveyor is enclosed inside a housing where the desired process takes place.

One of the important aspects of a spiral conveyor construction is the interaction between the endless conveyor belt and the drive tower which transmits a propulsion force from the drive tower to the endless conveyor belt thereby facilitating the transport of goods through the spiral conveyor construction.

The invention presents a novel drive tower construction which will ensure that a reliable and stable transition for engagement is achieved between the drive tower and the conveyor belt thereby allowing substantial force to be transmitted from the drive tower to the conveyor belt, without the risk of slipping between the conveyor belt and the drive tower. At the same time the transition from a straight running conveyor belt to a conveying guiding path which is substantially circular/helical circumventing the drive tower a number of times during the spiral conveyor construction shall also be facilitated.

DESCRIPTION OF THE INVENTION

The invention addresses this by providing a spiral conveyor construction comprising an endless conveyor belt assembled from a plurality of substantially identical modular belt links, where the endless conveyor belt is guided on a conveying path, where at least a part of the conveying path is surrounding a drive tower, where the drive tower can rotate around a vertical axis, such that the drive tower engages a side surface of the endless conveyor belt thereby propelling the endless conveyor along the conveying path and that spaced along the periphery of the drive tower are arranged vertical engagement members, where at least some of these engagement members has a vertically arranged rib projecting radially away from the drive tower, and where on a lower section of the drive tower adjacent at least some of the engagement members with projecting ribs, blocks are provided, said blocks near the bottom of the drive tower radially project further from the drive tower than the engagement members, and where the blocks are provided with a radially extending secondary rib which secondary ribs extend from the block and increases their extend upwards from zero extend to an extend corresponding to the radially extend of the rib on the adjacent engagement member near the upper end of the block, and where the secondary ribs and/or the ribs on the engagement members engages and propels the endless conveyor belt along the conveying path.

The vertically arranged ribs which project radially away from the center of the drive tower are intended for engagement with the endless conveyor belt. In the art there are a number of different endless conveyor belt constructions where special provisions are provided on the side of the endless conveyor belt adapted to engage the drive tower. With the present invention having the vertical ribs it is possible to engage these special provisions or to engage the side of the endless conveyor belt and in such instances convey the conveyor belt simply by the friction arising between the vertical rib and the side of the endless conveyor belt.

A particular feature which the drive tower has to address is the transition from the straight running part of the endless conveyor belt leading into the spiral conveyor construction and the endless conveyor belt's engagement with the periphery of the drive tower. In order to make a smooth transition the spiral conveyor construction according to the present invention is provided with blocks where a secondary rib is tapered from the bottom towards the upper part of the block such that at the very bottom of the block there is no rib but the rib slowly emerges from the surface of the block into it has a full extent corresponding to the extent of the ribs arranged on the vertical engagement members. In this manner the endless conveyor belt will slowly be eased onto the drive tower and due to the taper of the secondary rib, a controlled and a gliding engagement between the drive tower and the endless conveyor belt will be achieved.

In this context it has to be noted that the endless conveyor belt will contact the drive tower in the same positions, i.e. the conveyor belt is not peripherally displaced relative to the drive tower, but only vertically displaced. It shall be achieved that there is no velocity difference between the edge of the conveyor belt and the drive tower. Any difference in velocity is an indication of slippage between the endless belt and the drive tower, which is not intended.

In a further advantageous embodiment of the invention the secondary rib emerges a distance up from the bottom of the block. As already mentioned above, the easing of the conveyor belt from the straight running path of the conveying belt to a spiral conveyor construction alters the characteristics in the belt such that tensions, loads etc. must be redistributed. By making the transition process from the straight running part of the conveyor belt to the guided conveying path circulating the drive tower a smoother running conveying belt is provided.

In a still further advantageous embodiment of the invention the peripheral distance between the ribs on the engagement members and the secondary ribs on adjacent blocks corresponds to the length in the travelling direction of a modular belt link from which the endless conveyor belt is assembled. In this manner it is ensured that the engagement ribs whether on the engagement members or on the adjacent blocks during operation will engage at well determined position on the side surface of the conveyor belt. This is important in that by being able to determine where the interaction is between the drive tower and the endless conveyor belt, the conveyor belt may be designed for this engagement and furthermore, it may be assured that the ribs do not engage in undesired positions.

In a further advantageous embodiment of the invention the modular belt links from which the endless conveyor is assembled are laterally limited by two sides, and that the outermost sides of the modular belt links are provided with a cutout, such that the width of the modular conveyor belt link is smaller in the cutout than outside the cut-out, and where the lengthwise distance of the cut-out in the travelling direction of the conveyor belt corresponds to the width of the ribs and the secondary ribs, such that the secondary ribs and the ribs will engage the endless conveyor by the ribs and/or secondary ribs engaging the cut-out. The cut-outs are determined points at which the ribs whether on the blocks or on the vertical engagement members may positively engage the conveyor belt and as such transfer the propulsion force from the drive tower to the endless conveyor belt.

The invention is also directed to a drive tower for propelling an endless conveyor belt along a helical conveying path arranged outside said drive tower, where said drive tower has a top and a bottom and where a plurality of engagement members are arranged vertically between the top and bottom, where at least some of the engagement members has a rib projecting radially outwards from said engagement member, and where a number of blocks are arranged in a lower section of the drive tower immediately adjacent at least some of the engagement members with ribs, where the lowermost part of each block extends radially further from the drive tower, than the rib on the engagement member, and where a second rib having an increasing radially extend is arranged parallel with the ribs on the engagement members, where the rib on the blocks in the lower end has zero radial extend from the block and the rib upwards has an extend corresponding to the rib on the adjacent engagement member. The embodiments of the drive tower provide the same advantages as already discussed above.

DESCRIPTION OF THE DRAWING

The invention will now be described with reference to the accompanying drawings wherein.

DETAILED DESCRIPTION OF THE INVENTION

Figure 1:
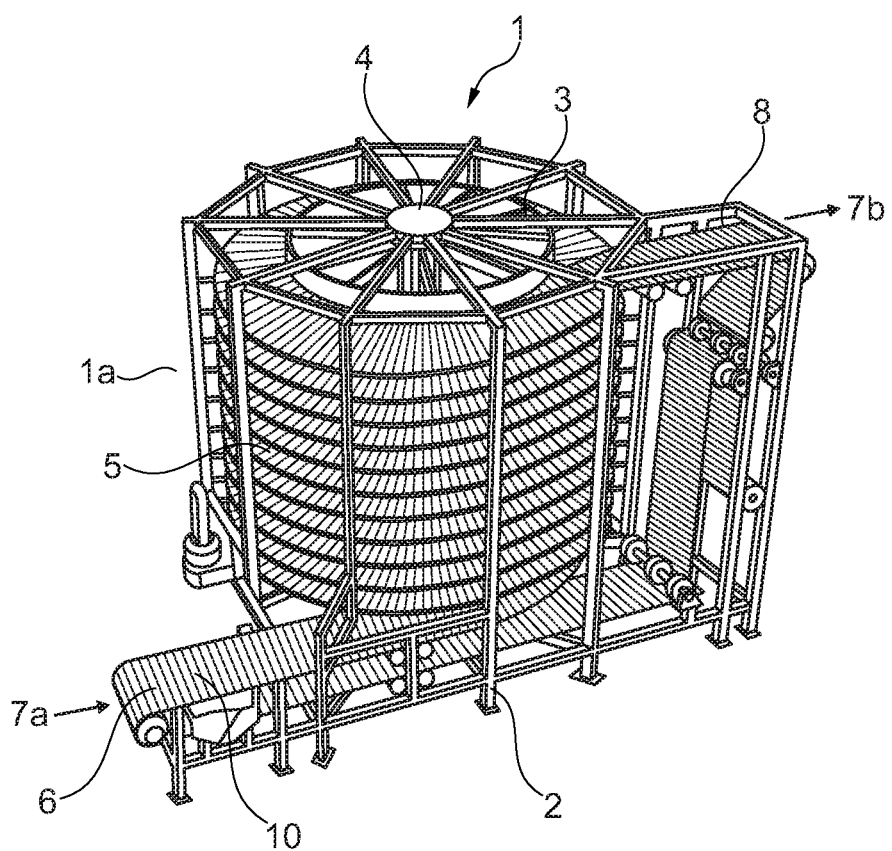
FIG. 1: illustrates a typical spiral conveyor construction.

In FIG. 1 is illustrated a typical spiral conveyor construction comprising a frame structure 2 suitable to be placed on a floor of a manufacturing facility. Inside the frame structure 2 is provided a drive tower 3 which drive tower has a top and a bottom and where the drive tower 3 is arranged for rotation around a substantially vertical axis 4.

On the outside of the drive tower 3 is provided a conveying path 5. When an object is placed on the conveyor belt, at the entrance 6 to the spiral conveyor working in the direction as indicated by the arrow 7a the object will be transported on an endless conveyor 10 through the spiral conveyor along the spiral/helical conveying path 5 and finally be arriving at the outlet 8 where the object transported by the spiral conveyor 1 will be ready for further processing by leaving the spiral conveyor 1 as indicated by the arrow 7b.

As may be seen by the illustration the conveyor belt 10 is relatively long in that the spirals of the spiral path 5 circumvents the drive tower a number of times enlarging the effective conveying area compared to the area which the structure 1 takes up in a production facility. Furthermore, the drive tower 3 needs to engage the side of the conveyor belt 10 in order to propel the conveyor belt and the objects through the spiral part 1a of the conveying structure 1.

Figure 2:
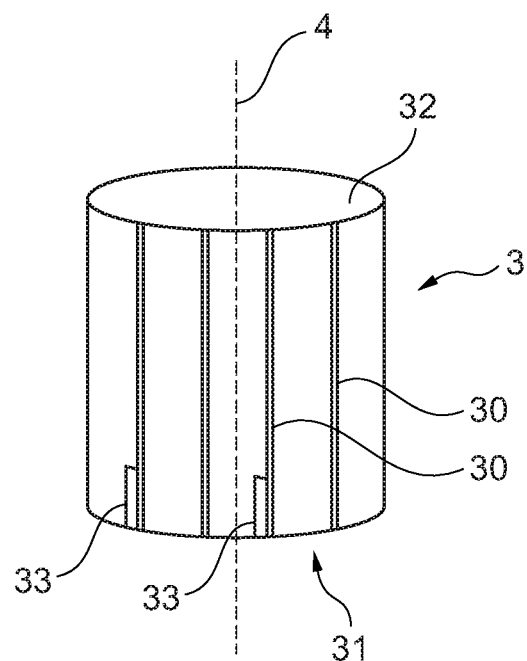
FIG. 2: illustrates a drive tower.

In FIG. 2 is schematically illustrated a drive tower 3 which is suitable to rotate around the vertical axis 4. On the outer periphery of the drive tower are provided a plurality of engagement members 30 which engagement members 30 are substantially evenly spaced along the periphery of the drive tower 3. The engagement members are arranged vertically such that they substantially span from the bottom 31 to the top 32 of the drive tower 3.

Adjacent some of the engagement members 30, blocks 33 are provided which blocks are also substantially evenly spaced along the periphery of the drive tower at a lower region of the drive tower 3. Both the engagement members 30 and the blocks 33 are provided with projecting ribs as will be explained below.

Figure 3:
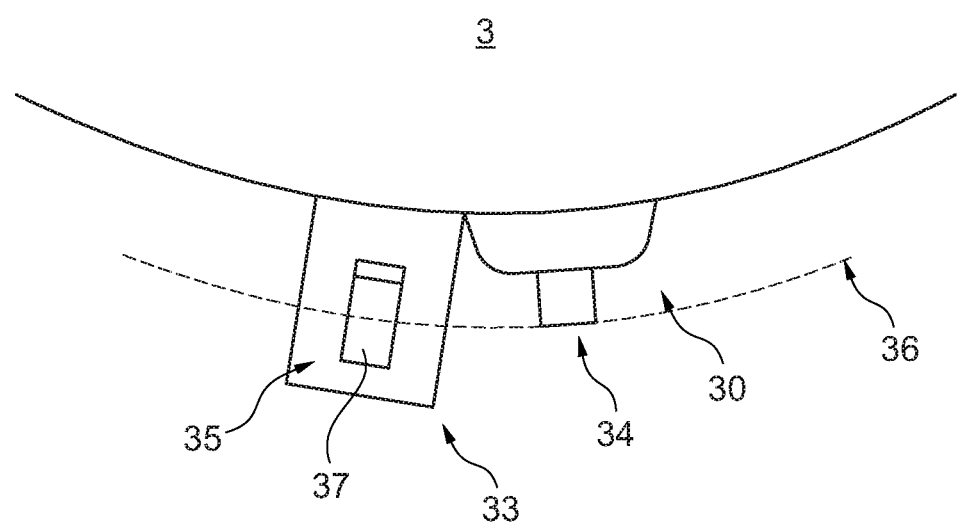
FIG. 3: illustrates a horizontal cross section through a drive tower.
Figure 4:
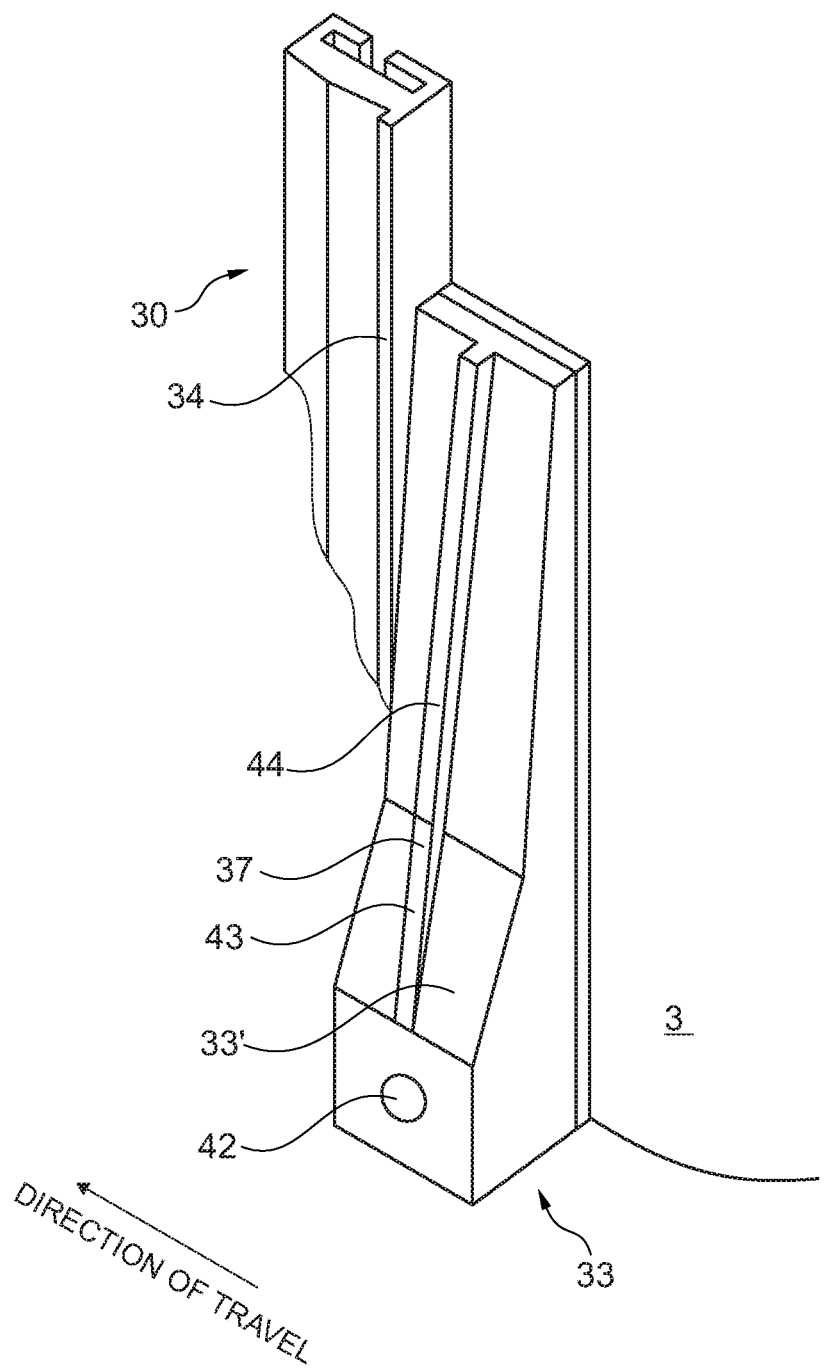
FIG. 4: illustrates the engagement block.

FIG. 3 illustrates a horizontal cross section through a drive tower 3 where the cross section illustrates a projecting engagement member 30 and a block 33 arranged adjacent the engagement member 30. The engagement member 30 is provided with a projecting rib 34 and the block 33 is also provided with a projecting secondary rib 35. For illustrative purposes the rib 34 on the engagement member 30 is illustrated at projecting radially out to a radius illustrated by the dashed line 36. The rib 35 projecting from the block 33 does as may be seen in the figure project radially further than the projecting rib 34 on the engagement member 30. In the embodiment illustrated in FIG. 3, the secondary rib 35 provided on the block 33 has a tapered engagement surface as will be explained below with reference to FIG. 4.

When a drive tower 3 according to the present invention for example as illustrated in FIG. 3 is mounted in a spiral conveyor structure the endless conveyor belt 6 will typically as illustrated above with reference to FIG. 1 enter the spiral conveyor near the bottom of the drive tower 3 and then after a number of circles around the drive tower leave the drive tower as illustrated by reference number 8. When the endless conveyor belt transfers from a straight running to a circular running conveyor belt as described above with reference to FIG. 1, the endless conveyor belt will first engage the blocks 33 in the lower part of the drive tower 3. As the conveyor belt travels higher the side of the conveyor will engage the engagement surface 37 on the rib 35 on the block 33. As is evident from FIG. 4 the engagement block 33 has various zones of engagement depending of the elevation of the belt relative to the drive tower 3.

In a first zone the block 33 does not have a projecting rib and this is the zone 42 where the endless conveyor belt first comes into contact with the block 33 and thereby the drive tower 3. Typically the zone 42 will also have a taper, meaning that the radius of the drive tower and the block near the bottom will be larger, than further up the block. As the conveyor belt travels higher through the guiding path the side of the conveyor belt will be engaged by a tapered portion 43 of the projecting rib 37. The difference in taper between the projecting rib 37 and the body of the block 33' allows the projecting rib 37 to ease into contact with the conveyor belt in order to provide a smooth transition. As the conveyor belt travels still further, it will enter a transition zone 44, where the taper of the projecting rib and the block 33 will cause the rib 34 provided on the vertical engagement member 30 to come into contact with the side of the conveyor belt. As the conveyor belt travels further up on the guide path provided circumscribing the drive tower the side of the engagement belt will only be in engagement with the projecting rib 34 on the engagement member. By arranging the projecting rib 37 on the block 33 at a determined distance from the projecting rib 34 of the engagement member 30 where the distance typically will be the length of the module in the transport direction from which the endless conveyor belt is assembled it is assured that the ribs 34, 37 will engage at exactly the same spot and it is possible to make engagement arrangements on the modular conveyor belt such that a firm and stable engagement may be achieved between the drive tower and the conveyor belt.

Figure 5:
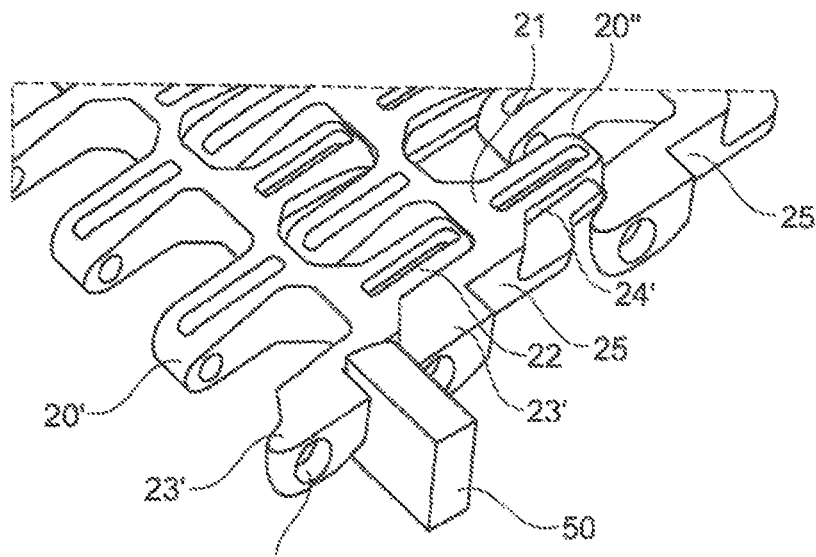
FIG. 5: illustrates a further embodiment of the invention where adjacent modular conveyor belt links are illustrated in an assembled manner.

In FIG. 5 is illustrated a further embodiment of the invention where adjacent modular conveyor belt links 20', 20" are illustrated in an assembled manner. The modular belt links are identical and in this embodiment the outermost eye part 23' is provided with a cut-out which allows the engagement member 50 on the drive tower (not illustrated) to engage the cut-out and positively drive the conveyor belt.

In this embodiment the cut-out is a cut-out where part of the material in the outermost eye part has been removed such that the outermost eye part 23' of an adjacent outer eye part of a further modular belt link may overlap the first outer eye part 23'.

As may be further seen from FIG. 5 the belt links are dimensioned such that the forwards extending eye parts 22 engage the bottom/main body 21 of the adjacent modular belt link and in this manner ensures that the cut-out 25 is free for the engagement member 50 to engage and drive the conveyor belt. In this embodiment the forward facing eye parts 22 are provided with oblong apertures 24' whereas the rearward facing eye parts are provided with circular apertures 24.

Figure 6:
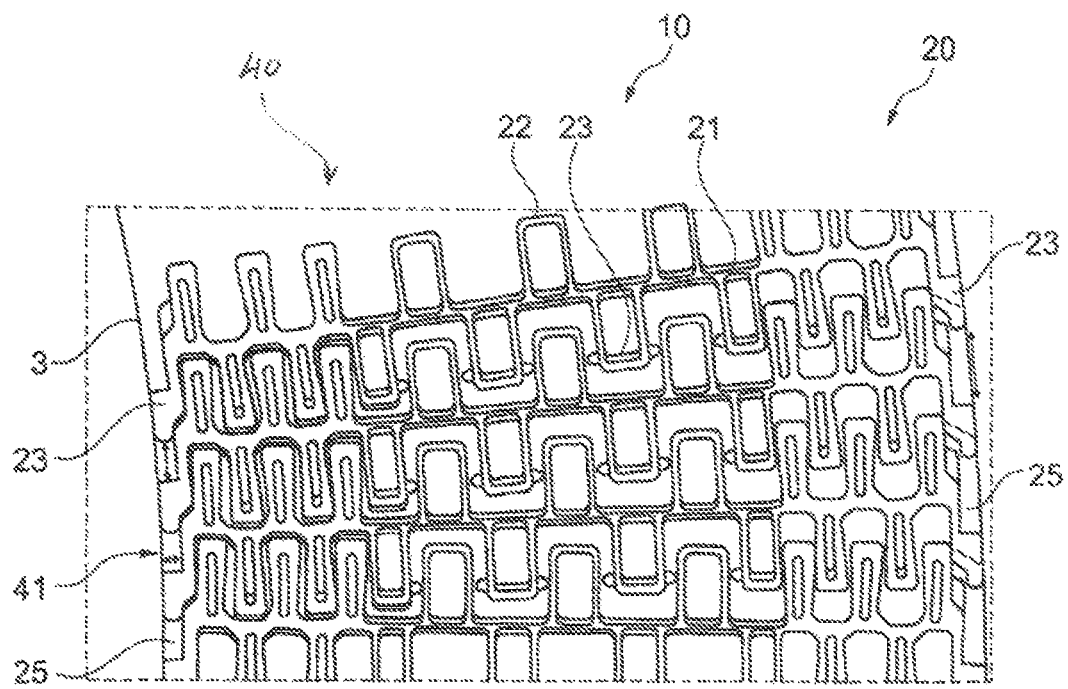
FIG. 6: illustrates a plan view of an endless conveyor belt.

In FIG. 6 is illustrated a plane view of an endless conveyor belt 40 assembled from a plurality of modular conveyor belt links 20 according to the invention. Each modular conveyor belt link 20 has a main body 21 from which main body 21 eye parts 22, 23 extend in forwards and rearwards directions.

The outermost eye parts 23 in both sides of the conveyor belt are provided with cut-outs 25 such that engagement means (not illustrated) on the drive tower 3 may engage and propel the conveyor belt 10 along the conveying path 5 (see FIG. 1). The depth 41 of the cut-out illustrated by the arrow is sufficient for the engagement member 50, see FIG. 5, to be inserted in the cut-out 25 sufficiently to attain a firm contact with the conveyor belt and as such be able to drive the conveyor belt in the desired direction.

As is evident from FIG. 6 the side of the conveyor belt closer to the drive tower 3 is collapsed such that the distance between adjacent eye parts along the inner side is substantially smaller than the same distance along the outer side of the conveyor belt. This is due to the provision of the elongated eye parts 24' allowing the connection pins to move longitudinally in the apertures.

The invention claimed is:

1. Spiral conveyor construction comprising an endless conveyor belt assembled from a plurality of substantially identical modular belt links, where the endless conveyor belt is guided on a conveying path, where at least a part of the conveying path is surrounding a drive tower, where the drive tower can rotate around a vertical axis, such that the drive tower engages a side surface of the endless conveyor belt thereby propelling the endless conveyor along the conveying path wherein spaced along the periphery of the drive tower are arranged vertical engagement members, where at least some of these engagement members has a vertically arranged rib projecting radially away from the drive tower, and where on a lower section of the drive tower adjacent at least some of the engagement members with projecting ribs, blocks are provided, said blocks near the bottom of the drive tower radially project further from the drive tower that the engagement members, and where the blocks are provided with a radially extending secondary rib which secondary ribs extend from the block and increases their extend upwards from zero extend to an extend corresponding to the radially extend of the rib on the adjacent engagement member near the upper end of the block, and where the secondary ribs and/or the ribs on the engagement members engages and propels the endless conveyor belt along the conveying path, and where the peripheral distance between the ribs on the engagement members and the secondary ribs on adjacent blocks corresponds to the length in the travelling direction of a modular belt link from which the endless conveyor belt is assembled.

2. The spiral conveyor construction according to claim 1, wherein the secondary rib emerges a distance up from the bottom of the block.

3. The spiral conveyor construction according to claim 1, where the endless conveyor belt on the first part of the conveying path engages the lower section of the blocks where the second ribs are not projecting, and as the guide path continues, the second ribs increasingly engages the endless conveyor belts' modular belt links.

4. The spiral conveyor construction according to claim 1, wherein the modular belt links from which the endless conveyor is assembled laterally is limited by two sides, and that the outermost sides of the modular belt links are provided with a cutout, such that the width of the modular conveyor belt link is smaller in the cutout than outside the cutout, and where the lengthwise distance of the cut-out in the travelling direction of the conveyor belt corresponds to the width of the ribs and the secondary ribs, such that the secondary ribs and the ribs will engage the endless conveyor by the ribs and/or secondary ribs engaging the cut-out.

5. Drive tower for propelling an endless conveyor belt along a helical conveying path arranged outside said drive tower, where said drive tower has a top and a bottom and where a plurality of engagement members are arranged vertically between the top and bottom, where at least some of the engagement members has a rib projecting radially outwards from said engagement member, and where a number of blocks are arranged in a lower section of the drive tower immediately adjacent at least some of the engagement members with ribs, where the lowermost part of each block extends radially further from the drive tower, than the rib on the engagement member, and where a second rib having an increasing radially extend is arranged parallel with the ribs on the engagement members, where the rib on the blocks in the lower end has zero radial extend from the block and the rib upwards has an extend corresponding to the rib on the adjacent engagement member.

6. The drive tower according to claim 5, wherein the second rib emerges a distance up from the bottom of the block.

7. The drive tower according to claim 5, wherein the peripheral distance between the ribs on the engagement members and the second ribs arranged on the blocks adjacent each engagement member with a rib is a fixed distance, where the fixed distance is equal to the length of a modular belt link in the intended travelling direction, from which the endless conveyor is assembled.

* * * * *